United States Patent Office 3,112,189
Patented Nov. 26, 1963

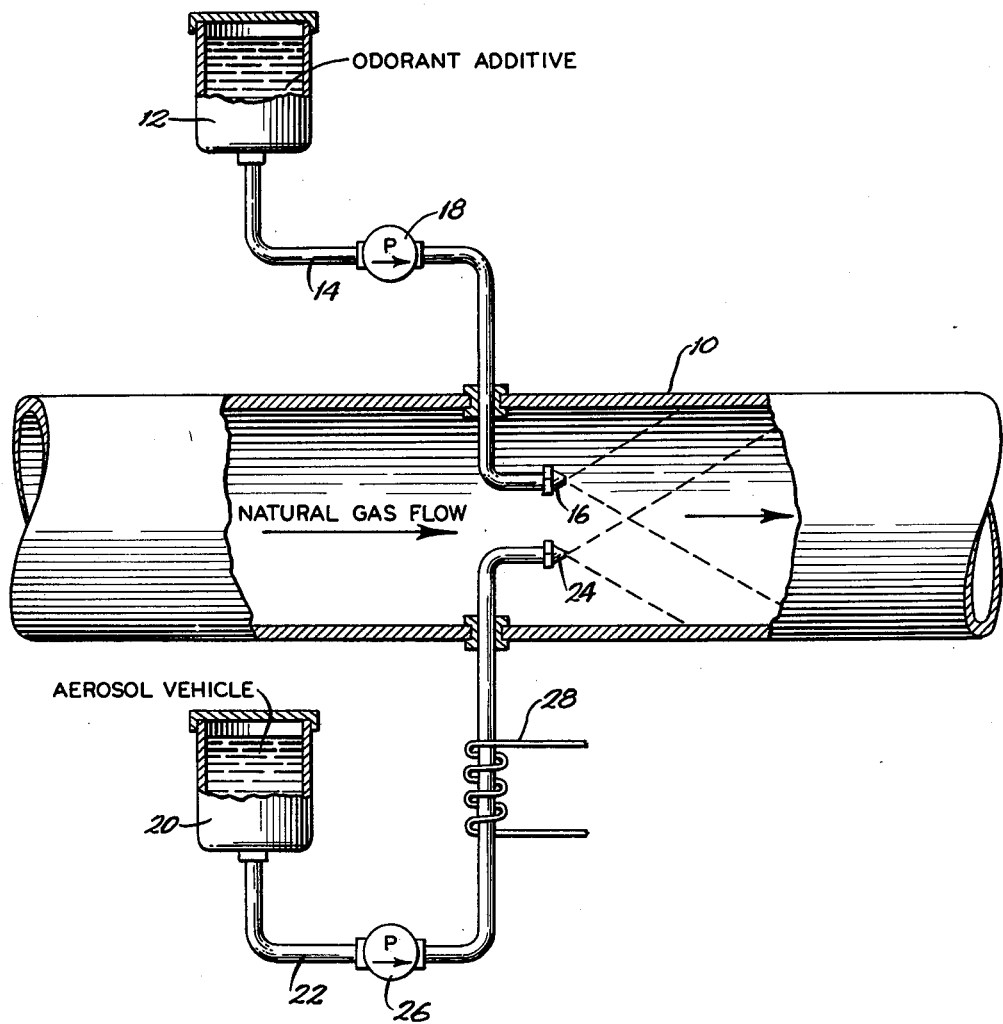

3,112,189
ODORIZATION OF PIPELINE GAS
Martin A. Elliott, La Grange, Ill., assignor to Institute of Gas Technology, Chicago, Ill., a corporation of Illinois
Filed Mar. 14, 1960, Ser. No. 14,992
3 Claims. (Cl. 48—195)

This invention relates to a new and improved method for odorization of pipeline gases such as natural gas or manufactured gas used for fuel.

In many such flow systems, the gas being conducted does not possess any outstanding odor or other physical property which would permit its presence in small amounts, such as may result from leaks, to be readily detected by the senses. The accidental escape of gas represents a substantial hazard, and it is highly important to be able to readily detect the unwanted presence of the gas outside its closed piping system. The risks of possible explosion and toxic effect upon humans are minimized by incorporating in the gases a highly odorous substance which will permit even small gas leakage to be readily recognized.

It has been common practice in the past, and particularly in the pipeline handling of natural gas, to add small quantities of highly odorous chemicals which have little or no effect upon the combustion characteristics of the gas, but which retain a high odor intensity throughout the flow system and over long periods of time. The problem of odor fading in the pipeline has limited the efficiency of gas odorant additives, and so far as I am aware, has not been satisfactorily solved heretofore. This problem has been particularly acute in pipeline systems of considerable length employing ferrous metal pipe material, as exists in the conducting of natural gas through large iron pipelines over distances of many miles.

It is a primary object of this invention to provide an odorant additive characterized by a strong and non-fading odor, and being long-lasting independently of confinement within a ferrous metal conduit.

The current practice in the odorization of gases is to add an odorant to the flowing gas stream in a vapor phase. I have discovered that considerable intensification in the effect of additive odorants can be obtained if the odorant is adsorbed on the surface of an aerosol. The meaning of the term "aerosol" is well understood as designating a suspension of fine solid or liquid particles in air or gas, and particularly discrete and non-agglomerating particles of a solid or non-volatile material in extremely small size. This invention contemplates the improved odorization of gas by the addition of an aerosol substance to the gas substantially simultaneously with and in addition to an odorant additive so as to provide a highly adsorptive surface for concentrating the effect of the odorant within the gas stream. This concentration in effect results from the impingement of the aerosol particles with adsorbed odorant on the olfactory membranes and by the deeper penetration of the aerosol into the respiratory system. Through the use of the method of the present invention, it is possible to maintain a strong level of odor intensity with substantially smaller quantities of odorant additive than has been possible in the past. It was unexpected that the odor would remain intense even after extended transmission through iron pipe.

A more or less diagrammatic representation of a gas flow conduit into which an odorant additive is introduced in accordance with the principles of the present invention is shown in the drawing.

Referring now to the drawing, I have indicated generally at 10 an iron pipeline through which a flow of natural gas or manufactured fuel gas is adapted to move substantially continuously in the direction indicated by the arrow. A reservoir 12 serves to provide a supply of odorant additive material through a conduit 14 to an atomizing nozzle 16. A pump 18 is provided to insure a substantially constant predetermined rate of flow. The nozzle 16 is disposed directly in the main gas flow stream.

Any of the well-known sulfur-containing odorant materials may be employed in the performance of the present invention. Typical materials currently in use are exemplified by the ethyl through amyl mercaptans and tertiary butyl mercaptan. Thiophane, various aromatic cyclic compounds, and sulfur refining by-products are also adaptable for use as odorants. These materials are referred to in the appended claims as organic sulfur compounds. A typical example of an orodant for gaseous fuels, and a general discussion of odorants and their properties, may be found in Pollock Patent No. 2,625,518.

I have indicated at 20 a reservoir containing an aerosol vehicle substance for delivery through a conduit 22 by a pump 26 to a spray means 24, adapted to introduce the vehicle into the main gas stream in the form of discrete and non-condensable or non-agglomerating particles. The vehicle may consist of any condensable liquid material than in itself is harmless and non-toxic, and which is adapted readily to the formation of a stable aerosol suspension. For this purpose, I have found that fogging oils, having a molecular weight ranging from that of kerosene to that of No. 2 fuel oil, are relatively inexpensive and satisfactory for the purposes of the present invention. It is necessary to provide fine aerosol particles which will not agglomerate, so as to maintain the uniformly distributed suspension in the gas stream over great lengths of pipeline and for long periods of time. For this purpose, the aerosol particles must be less than 5 microns in size. In the case of a liquid vehicle, such particle sizes may be provided through the use of an atomizing nozzle. As shown in the drawing, heating means 28 may be provided to vaporize the liquid vehicle, so that the vapor may be sprayed from the nozzle 24 into the relatively low temperature main gas stream for condensation in tiny droplets as an aerosol. Such operation is particularly suitable for the introduction of fogging oils into a natural gas pipeline.

Upon the formation of the aerosol within the pipeline in close proximity to the introduction of an odorant additive in finely divided form, the odorant will be adsorbed uniformly on the aerosol particles. In this way, the odorant additive will be carried along by and maintained within the main gas flow stream in the form of a uniformly distributed aerosol suspension.

It will be understood that the embodiment shown in the drawing and described above is merely a preferred arrangement. Various vehicle materials and correspondingly suitable aerosol-forming means may be employed; for example, solid substances such as magnesia, alumina, carbon black, and various non-carcinogenic solids may be utilized. It is of critical importance only that such particles be non-condensable or non-agglomerating and that they be less than 5 microns in size, so as to form a stable aerosol suspension capable of vapor adsorption.

It will be understood that various mechanical refinements in technique may be employed in the performance of the method of the present invention. For example, the introduction of the odorant additive may be controlled in direct proportion to the main gas flow, and such introduction may be further coordinated so as to regulate the introduction of the aerosol vehicle in its proportional required amounts. The apparatus and mechanics of such devices are not a part of the present invention, but it will be understood that such techniques may be employed in insuring optimum operation through the introduction of a minimum required quantity of odorant additive in direct proportion to the main gas flow, and whereby such odorant additive will be substantially fully adsorbed by the particles of a coordinately introduced aerosol vehicle.

While there has been shown and described particular embodiments of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A method for odorizing noxious fuel gases flowing through an iron transmission line which comprises spraying a fogging oil into said flowing gas in the form of discrete stable non-condensible non-agglomerating particles less than 5 microns in size, and simultaneously, and at the same location spraying an odorant substance consisting essentially of an organic sulfur compound into the fogging oil to cause an olfactory-responsive quantity of said odorant substance to be absorbed on said fogging oil particles, thereby greatly intensifying the odor to reduce fading during transmission of said gas through great distances in said line.

2. The method of claim 1 wherein said fogging oil is a petroleum hydrocarbon having a molecular weight ranging from that of kerosene to that of No. 2 fuel oil.

3. The method of claim 2 wherein said spraying is assisted by heating the oil to vaporizing temperature prior to spraying.

References Cited in the file of this patent

UNITED STATES PATENTS

| | | |
|---|---|---|
| 2,460,792 | Pabst | Feb. 1, 1949 |
| 2,789,893 | Coats | Apr. 23, 1957 |
| 2,823,104 | McClure | Feb. 11, 1958 |
| 2,944,029 | Jones | July 5, 1960 |
| 2,979,389 | Blount | Apr. 11, 1961 |

FOREIGN PATENTS

| | | |
|---|---|---|
| 744,547 | Great Britain | July 27, 1954 |